United States Patent [19]

Yamamoto et al.

[11] Patent Number: 5,121,461
[45] Date of Patent: * Jun. 9, 1992

[54] HEAT-RESISTANT PLASTIC OPTICAL FIBER AND PROCESS FOR THE PRODUCTION THEREOF

[75] Inventors: Takashi Yamamoto; Tsuruyoshi Matsumoto; Katsuhiko Shimada, all of Ohtake, Japan

[73] Assignee: Mitsubishi Rayon Co., Ltd., Tokyo, Japan

[*] Notice: The portion of the term of this patent subsequent to Oct. 30, 2007 has been disclaimed.

[21] Appl. No.: 590,946

[22] Filed: Oct. 1, 1990

[30] Foreign Application Priority Data

Oct. 6, 1989 [JP] Japan ................................. 1-260277

[51] Int. Cl.⁵ .............................................. G02B 6/00
[52] U.S. Cl. ................................ 385/142; 385/141; 385/123
[58] Field of Search ................. 350/96.33, 96.34, 96.3; 385/141, 142, 123, 126

[56] References Cited

U.S. PATENT DOCUMENTS 4,966,435  10/1990  Matsumoto et al. ............ 350/96.34

Primary Examiner—Frank Gonzalez
Assistant Examiner—Stephen W. Barns
Attorney, Agent, or Firm—Finnegan, Henderson, Farabow, Garrett and Dunner

[57] ABSTRACT

A heat-resistant plastic optical fiber having a concentric three-layered structure comprising a core layer, a sheath layer and a protective layer, wherein the polymer constituting the sheath layer is a copolymer comprising 30 to 80 mole % of a fluorodioxole represented by the general formula:

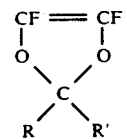

wherein R and R' are each a fluorine atom or a trifluoromethyl group, and 70 to 20 mole % of at least one other comonomer. Also, a process for the production of the heat-resistant plastic optical fiber comprising spinning a core-forming polymer, a sheath-forming polymer and a protective layer-forming polymer by a three-layered conjugate spinning process.

5 Claims, 1 Drawing Sheet

HEAT-RESISTANT PLASTIC OPTICAL FIBER AND PROCESS FOR THE PRODUCTION THEREOF

BACKGROUND OF THE INVENTION

The present invention relates to a plastic optical fiber excellent in heat resistance and a process for the production of the same.

Recently, plastic optical fibers have been noticed owing to their features such as excellent flexibility and processability, large numerical aperture and so on, so that the demand for them has been remarkably increased. However, these plastic optical fibers are insufficient in heat resistance, because, for example, an optical fiber containing a core made of polymethyl methacrylate is resistant only to a temperature up to 85° C. and an optical fiber containing a core made of polycarbonate is resistant only to a temperature of 125° C. at the highest, so that they are unsatisfactory for use in the vicinity of an automotive engine, though such use is one of the fields of short-distance communication which will have a great demand for optical fibers. For example, a plastic optical fiber having a sheath made of a polymer mainly comprising α-fluoroacrylate as disclosed in Japanese Patent Kokai Publication No. 61-103107 is substantially resistant only to a temperature up to about 120° C., because the glass transition point of the polymer constituting the sheath is about 120° C. Further, a plastic optical fiber having a sheath made of a polymer component mainly comprising poly-4-methyl-pentyne as disclosed in Japanese Patent Kokai Publication No. 61-245110 has serious defects in practical use because the polymer constituting the sheath discolors in the long-term heat resistance test at 125° C. which lowers the light transmission performance and because the adhesion of the sheath to the core is poor, though it has a melting point of 240° C. to be satisfactory in respect of heat distortion resistance.

SUMMARY OF THE INVENTION

The primary object of the present invention is to provide a plastic optical fiber excellent in heat resistance and exhibiting good light transmission characteristics and a process for the production of the same.

More specifically, in accordance with the present invention, there is provided a heat-resistant plastic optical fiber having a concentric three-layered structure comprising a core layer, a sheath layer and a protective layer, wherein the polymer constituting said sheath layer is a copolymer comprising 30 to 80 mole % of a fluorodioxole represented by the general formula [I]:

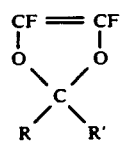

wherein R and R' are each a flourine atom or a trifluoromethyl group, and 70 to 20 mole % of at least one other comonomer; and a process for the production of the same.

DESCRIPTION OF THE PREFERRED EMBODIMENTS

Figure 1:
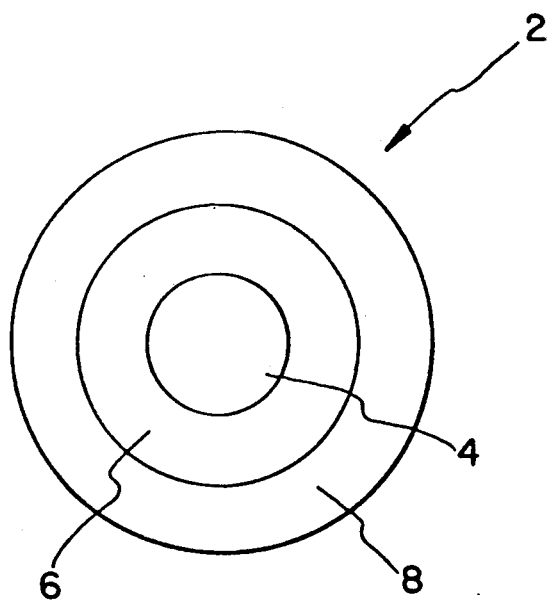
FIG. 1 is a diagram of the three-layered optical fiber of the present invention.

The core-forming polymer to be used in the present invention may be any transparent resin and examples thereof include methyl methacrylate polymers, methacrylate derivative polymers, styrene polymers and polycarbonates. Further, a polymer comprising at least 2% by weight of a cyclic structural unit represented by the following formula:

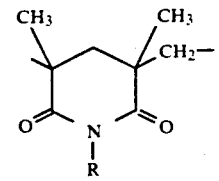

wherein R is an alkyl or cycloalkyl group, and at most 98% by weight of a comonomer unit based one methyl methacrylate can also be used as the core-forming polymer. Among these, the use of a polycarbonate as the core-forming polymer is particularly preferable in order to obtain a heat-resistant plastic optical fiber.

The sheath-forming polymer to be used in the present invention is a copolymer comprising 30 to 80 mole % of a fluorodioxole represented by the general formula [I]:

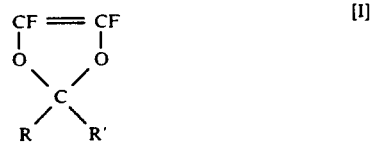

wherein R and R' are each a flourine atom or a trifluoromethyl group, and 70 to 20 mole % of at least one other comonomer.

A fluorodioxole represented by the general formula [I] can be synthesized by, for example, a method disclosed in U.S. Pat. No. 3,865,845. A copolymer of the fluorodioxole and the other comonomer can be obtained by, for example, a method disclosed in U.S. Pat. No. 3,978,030.

Examples of the other comonomers copolymerizable with the fluorodioxole include ethylene, propylene, isobutylene, butene-1, methyl vinyl ether, ethyl vinyl ether, propyl vinyl ether, propyl vinyl ether, butyl vinyl ether, $CF_2=CF_2$, $CHF=CF_2$, $CH_2=CF_2$, $CH_2=CHF$, $CCl=CFhd 2$, $CHCl=CF_2$, $CCl_2=CF_2$, $CClF=CClF$, $CHF=CCl_2$, $CH_2=CClF$, $CCl_2=CClF$, etc., fluoropropylene-type compounds such as $CF_3CF=CF_2$, $CF_3CF=CHF$, monomers having functional groups such as perfluoro(alkyl vinyl ether), methyl-3-[1-[difluoro[(trifluoroethenyl)oxy]methyl]-1,2,2,2-tetrafluoroethoxy]-2,2,3,3-tetrafluoropropanate, 2-[1-[difluoro[(trifluoroethenyl)oxy]methyl]-1,2,2,2-tetrafluoroethoxy]-1,1,2,2-tetrafluoroethanesulfonyl floride, etc.

The sheath-forming polymer to be used in the present invention preferably has a glass transition point of 120° C. or above and must satisfy the requirements that the polymer should be an amorphous one free from any crystalline structure which is one of the causes for lowering the light transmission characteristics of an optical fiber, that the adhesion between the core and the sheath should be high, and that the polymer should be excellent in shape retentivity. In order to meet the above requirements, it is necessary that the sheath-forming polymer contain a fluorodioxole represented by the general formula I in an amount of 30 to 80 mole %. If the content of the fluorodioxole is less than 30 mole %, the resulting polymer cannot exhibit sufficient heat resistance as a sheath-forming material of a heat-resistant optical fiber, while if the content exceeds 80 mole %, the resulting polymer will exhibit too high a melt viscosity to conduct the conjugate melt spinning thereof. Various compounds can be used as the other comonomers to be copolymerized with the fluorodioxole. Preferred examples of the comonomers include tetrafluoroethylene, chlorotrifluoroethylene, RfCF=CF$_2$ (wherein Rf represents a primary fluoroalkyl group having 1 to 5 carbon atoms) and RgCFOCF=CF$_2$ (wherein Rg represents a primary fluoroalkyl group having 1 to 5 carbon atoms or a primary fluoroalkyl group having 4 to 12 carbon atoms in total and containing an ether linkage oxygen atom).

As illustrated in FIG. 1, the optical fiber of the present invention has a concentric three-layered structure comprising a core layer 4, a sheath layer 6 and a protective layer 8.

It is preferable from the standpoint of the heat resistance of the fiber that the protective layer-forming polymer have a glass transition point of 130° C. or above, or a melting point of 130 ° C. or above. Examples thereof include a polycarbonate (Tg: 148° C.), a polysulfone (Tg: 190° C.), a polyarylate (Tg: 180° C.), a nylon 12 (Tm: 180° C.), a polyacetal (Tm: 165° C.), a polyethylene terephthalate (Tm: 250° C.) and a polyvinylidene fluoride (Tm: 170° C.).

It is particularly preferable from the standpoint of the stability and efficiency of production that the optical fiber of the present invention be produced by the three-layered conjugate spinning of a core-forming polymer, a sheath-forming polymer and a protective layer-forming polymer.

The present invention will now be described in more detail by referring to the following Examples.

EXAMPLE 1

A polycarbonate (a product of Mitsubishi Gas Chemical Company, Inc., Iupilon S-2000 F; $\overline{M}v$ 24,000) as a core-forming polymer, was fed into a vented extruder hopper, melted at a barrel temperature of 240° C., metered with a gear pump (hereinafter referred to as GP) at 230° C. and continuously fed into the portion for forming a core layer in an apparatus for three-layered conjugate spinning. Separately, a copolymer comprising 62 mole % of a perfluoro(2,2-dimethyl-1,3-dioxole) and 38 mole % of tetrafluoroethylene which exhibiting a single glass transition point at 134° C. as a seath-forming polymer, was fed into another extruder hopper, melted at a barrel temperature of 220° C., metered with GP at 230° C. and continuously fed into the portion for forming a sheath layer in the apparatus. Further, another polycarbonate (a product of Mitsubishi Gas Chemical Company, Inc., Iupilon H-3000 F; $\overline{M}v$ 19,000) as a protective layer-forming polymer was fed into another vented extruder hopper, melted at a barrel temperature of 240° C., metered with GP at 230° C. and continuously fed into the portion for forming a protective layer in the apparatus. The polymers thus fed into the apparatus were spun through a nozzle at 235° C. to give a three-layered optical fiber. This fiber had an outer diameter of 1000 μm, a sheath thickness of 5 μm and a protective layer thickness of 15 μm.

The optical fiber exhibited light transmission loss of 620 dB/Km at 770 nm. Further, the fiber was wound round a rod having a diameter of 10 mm 100 turns to determine the light quantity retention. The retention was 91% and the sheath caused neither delamination nor cracking.

$$\text{Light quantity retention (\%)} = \frac{\text{light quantity after winding}}{\text{light quantity before winding}} \times 100$$

Further, the optical fiber was exposed to heat at 135° C. for 2000 hours and thereafter examined for light transmission loss. The loss was 653 dB/Km at 770 nm which reveals that the fiber is excellent in heat resistance.

EXAMPLE 2

The same core-forming and sheath-forming polymers as those used in Example 1 were each fed into the same apparatus for three-layered conjugate spinning as that used in Example 1 in a similar manner to that of Example 1, while a polyvinylidene fluoride (Tm: 168° C.) as a protective layer-forming polymer was melted at 210° C., metered with GP at 230° C. and continuously fed into the apparatus. The three polymers were spun through a nozzle at 235° C. to give a three-layered optical fiber. This fiber had an outer diameter of 1000 μm, a sheath thickness of 5 μm and a protective layer thickness of 15 μm.

The evaluation tests for the light transmission loss, light quantity retention in a state wound 100 turns (10 mmφ) and light transmission loss after the exposure to heat at 135° C. for 2000 hours of the obtained optical fiber were conducted in the same methods as used in Example 1, and the results obtained are given in Table 1.

COMPARATIVE EXAMPLE 1

An optical fiber having an outer diameter of 1000 μm was produced in the same manner as that of Example 1 except that the sheath-forming polymer was replaced by a copolymer comprising 25 mole % of perfluoro(2,2-dimethyl-1,3-dioxole) and 75 mole % of tetrafluoroethylene which exhibiting a single glass transition point at 83° C. The results of the evaluation of the fiber are also given in Table 1.

COMPARATIVE EXAMPLE 2

A three-layered optical fiber was produced by feeding the polymers into an apparatus for three-layered conjugate spinning under the same conditions as those of Example 1 except that the sehath-forming polymer was replaced by a copolymer comprising 84 mole % of perfluoro(2,2-dimethyl-1,3-dioxole) and 16 mole % of tetrafluoroethylene which exhibiting a single glass transition point at 215° C., and spinning the polymers through a nozzle at 235° C. The obtained optical fibers had an outer diameter of 1000±400 μm, thus exhibiting a large variation in diameter. Further, it had several areas where the core layer was uncovered with the sheath layer. The light transmission loss thereof was as large as 19,200 dB/Km.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

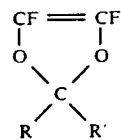

wherein R and R' are each a fluorine atom or trifluoromethyl group, and 70 to 20 mole % of at least one other comonomer.

TABLE 1

|  | Core-forming polymer | Sheath-forming polymer | Protective layer-forming polymer | Light transmission loss (770 nm dB/Km) | Light quantity retention (%) (10 mmφ, 100 turns) | Heat resistance (135° C., 2000 HR) dB/Km |
|---|---|---|---|---|---|---|
| Example 1 | PC | PDD 62 mol % TFE 38 mol % Tg 134° C. | PC Tg 134° C. | 620 | 91 | 653 |
| Example 2 | PC | PDD 62 mol % TFE 38 mol % Tg 134° C. | PVdF Tm 170° C. | 636 | 89 | 655 |
| Comparative Example 1 | PC | PDD 25 mol % TFE 75 mol % Tg 83° C. | PC | 621 | 91 | 2218 |
| Comparative Example 2 | PC | PDD 84 mol % TFE 16 mol % Tg 215° C. | PC | 19200 | — | — |

PDD perfluoro-2,2-dimethyl-1,3-dioxole
TFE tetrafluoroethylene

What is claimed is:

1. A heat-resistant plastic optical fiber having a concentric three-layered structure comprising a core layer, a sheath layer and a protective layer, wherein the polymer constituting said sheath layer is a copolymer comprising 30 to 80 mole % of a fluorodioxole represented by the general formula:

2. A plastic optical fiber as set forth in claim 1, wherein said fluorodioxole is perfluoro-2,2-dimethyl-1,3-dioxole and said one other comonomer is tetrafluoroethylene.

3. A plastic optical fiber as set forth in claim 1, wherein the polymer constituting said core layer is a polycarbonate.

4. A heat-resistant plastic optical fiber as set forth in claim 1, wherein the polymer constituting said protective layer is one having a glass transition point of 130° C. or above, or a melting point of 130° C. or above.

5. A process for the production of a heat-resistant plastic optical fiber as set forth in claim 1, comprising spinning a core-forming polymer, a sheath-forming polymer and a protective layer-forming polymer by a three-layered conjugate spinning process.

* * * * *